United States Patent [19]

Kuennen et al.

[11] Patent Number: 5,853,572

[45] Date of Patent: *Dec. 29, 1998

[54] HOME WATER PURIFICATION SYSTEM

[75] Inventors: Roy W. Kuennen, Kentwood; Robin M. Dykhouse, Grand Rapids; Dennis J. Kool; Ronald C. Markham, both of Kentwood; Bradley J. Pippel, Grandville; Dennis E. Kidd, Rockford; Merlin G. Tiede, Ada, all of Mich.

[73] Assignee: Amway Corporation, Ada, Mich.

[ * ] Notice: The term of this patent shall not extend beyond the expiration date of Pat. No. 5,698,091.

[21] Appl. No.: 788,251

[22] Filed: Jan. 25, 1997

Related U.S. Application Data

[60] Continuation of Ser. No. 479,430, Jun. 7, 1995, abandoned, which is a division of Ser. No. 35,011, Mar. 22, 1993, Pat. No. 5,536,395.

[51] Int. Cl.$^6$ .......................... B01D 35/143; B01D 36/00
[52] U.S. Cl. ........................... 210/87; 210/137; 210/192; 210/232; 210/266; 250/435; 250/437; 422/186.3
[58] Field of Search .................................. 210/85, 87, 91, 210/92, 137, 143, 192, 232, 282, 295, 437, 440, 259, 266; 250/432 R, 435, 436, 437; 422/186.3

[56] References Cited

U.S. PATENT DOCUMENTS

| | | |
|---|---|---|
| D. 348,722 | 7/1994 | Pippel ................................. D23/233 |
| 1,079,503 | 11/1913 | Linker . |
| 1,140,819 | 5/1915 | Henri et al. . |
| 2,401,914 | 6/1946 | DiPietro . |
| 2,537,774 | 1/1951 | Machinist . |
| 2,636,991 | 4/1953 | Postell . |
| 2,719,932 | 10/1955 | Stanworth . |
| 2,892,051 | 6/1959 | Moore . |
| 2,968,734 | 1/1961 | Yeomans . |
| 3,182,193 | 5/1965 | Ellner et al. . |
| 3,276,458 | 10/1966 | Iversen et al. . |
| 3,289,847 | 12/1966 | Rothemund . |
| 3,413,465 | 11/1968 | Harrison et al. . |
| 3,426,206 | 2/1969 | Smith . |
| 3,456,107 | 7/1969 | Robertson . |
| 3,462,597 | 8/1969 | Young . |
| 3,471,693 | 10/1969 | Veloz . |
| 3,491,234 | 1/1970 | Wiltrout . |
| 3,519,817 | 7/1970 | Brunner . |
| 3,550,782 | 12/1970 | Veloz . |
| 3,562,520 | 2/1971 | Hippen . |

(List continued on next page.)

FOREIGN PATENT DOCUMENTS

| | | |
|---|---|---|
| 0316687 | 5/1989 | European Pat. Off. . |
| 3840276 | 5/1990 | Germany . |
| 58-62230 | 10/1981 | Japan . |

*Primary Examiner*—Joseph W. Drodge
*Attorney, Agent, or Firm*—Warner Norcross & Judd LLP

[57] ABSTRACT

A point of use water purification system for home use is provided comprising a carbon block filter housed in a self-contained disposable pressure vessel for removing particulates and organic contaminants from water. The filter is provided with a pore-size distribution, a binder and a flow path which optimizes filtration performance and enhances microbiological kill rates obtained in a source of radiant energy which is used to kill microorganisms in the filtered water. The source of radiant energy comprises an ultraviolet discharge lamp having an elongate central axis and a diverter for providing a spiral plug flow of water about the discharge lamp. A flow regulator adjusts flow through the system for varying line pressure conditions to ensure adequate exposure of microorganisms to ultraviolet energy. A lamp control circuit conserves power and optimizes ultraviolet output. A diagnostic system includes a filter monitor which provides an automatic indication to the user when the filter has reached its end of life. The diagnostic system includes a radiation source monitor which provides an automatic indication to the user when the UV discharge bulb has malfunctioned. A filter quick-disconnect, a radiation source quick-disconnect and associated power safety interlocks protect the user and facilitate the safe and easy replacement of the disposable filter cartridge and ultraviolet discharge bulb.

6 Claims, 9 Drawing Sheets

U.S. PATENT DOCUMENTS

| | | |
|---|---|---|
| 3,566,105 | 2/1971 | Wiltrout et al. . |
| 3,602,712 | 8/1971 | Mann et al. . |
| 3,767,918 | 10/1973 | Graybeal . |
| 3,814,680 | 6/1974 | Wood . |
| 3,836,781 | 9/1974 | Ellison . |
| 3,842,870 | 10/1974 | Burgess . |
| 3,894,286 | 7/1975 | Hazelrigg . |
| 3,923,663 | 12/1975 | Reid . |
| 3,934,042 | 1/1976 | De Stoutz . |
| 3,944,876 | 3/1976 | Helmuth . |
| 3,948,772 | 4/1976 | Ellner . |
| 3,950,251 | 4/1976 | Hiller . |
| 4,051,411 | 9/1977 | Knoble et al. . |
| 4,141,686 | 2/1979 | Lewis . |
| 4,151,085 | 4/1979 | Malik . |
| 4,204,956 | 5/1980 | Flatow . |
| 4,213,021 | 7/1980 | Alexander . |
| 4,255,663 | 3/1981 | Lewis . |
| 4,296,328 | 10/1981 | Regan . |
| 4,302,677 | 11/1981 | Albertsson et al. . |
| 4,336,223 | 6/1982 | Hillman . |
| 4,348,357 | 9/1982 | Bithell . |
| 4,381,476 | 4/1983 | Adachi et al. . |
| 4,400,270 | 8/1983 | Hillman . |
| 4,454,036 | 6/1984 | Suzuki . |
| 4,471,225 | 9/1984 | Hillman . |
| 4,488,087 | 12/1984 | Adachi et al. . |
| 4,489,616 | 12/1984 | Priddy . |
| 4,504,445 | 3/1985 | Walz . |
| 4,557,829 | 12/1985 | Fields . |
| 4,595,498 | 6/1986 | Cohen et al. . |
| 4,615,799 | 10/1986 | Mortensen . |
| 4,623,451 | 11/1986 | Oliver . |
| 4,661,264 | 4/1987 | Goudy, Jr. . |
| 4,682,084 | 7/1987 | Kuhnel et al. . |
| 4,694,179 | 9/1987 | Lew et al. . |
| 4,698,164 | 10/1987 | Ellis . |
| 4,700,101 | 10/1987 | Ellner et al. . |
| 4,752,401 | 6/1988 | Bodenstein . |
| 4,753,728 | 6/1988 | VanderBilt et al. ............... 210/282 |
| 4,762,611 | 8/1988 | Schipper . |
| 4,769,131 | 9/1988 | Noll et al. . |
| 4,798,702 | 1/1989 | Tucker . |
| 4,816,145 | 3/1989 | Goudy, Jr. . |
| 4,831,564 | 5/1989 | Suga . |
| 4,847,536 | 7/1989 | Lowe et al. . |
| 4,859,386 | 8/1989 | VanderBilt et al. ............... 264/113 |
| 4,909,931 | 3/1990 | Bibi ................................... 210/85 |
| 4,915,831 | 4/1990 | Taylor . |
| 4,918,426 | 4/1990 | Butts et al. . |
| 4,938,259 | 7/1990 | Schmidt . |
| 4,948,505 | 8/1990 | Petrucci et al. . |
| 4,959,141 | 9/1990 | Anderson . |
| 4,963,750 | 10/1990 | Wilson . |
| 4,968,437 | 11/1990 | Noll et al. . |
| 4,992,166 | 2/1991 | Lowsky et al. . |
| 5,004,541 | 4/1991 | Noll et al. . |
| 5,006,244 | 4/1991 | Maarschalkerweerd . |
| 5,017,284 | 5/1991 | Miler et al. . |
| 5,017,318 | 5/1991 | VanderBilt et al. ............... 264/113 |
| 5,023,460 | 6/1991 | Foster, Jr. et al. . |
| 5,045,189 | 9/1991 | Van der Vos et al. . |
| 5,068,030 | 11/1991 | Chen ................................. 210/95 |
| 5,069,782 | 12/1991 | Moyher, Jr. et al. ............. 210/192 |
| 5,070,220 | 12/1991 | Glenn . |
| 5,078,876 | 1/1992 | Whittier et al. . |
| 5,083,589 | 1/1992 | Wilcock . |
| 5,089,144 | 2/1992 | Ozkahyaoglu et al. .......... 210/87 |
| 5,128,034 | 7/1992 | Kool ................................. 210/87 |
| 5,130,020 | 7/1992 | Meckstroth . |
| 5,133,385 | 7/1992 | Kawakami . |
| 5,230,792 | 7/1993 | Sauska et al. . |
| 5,269,919 | 12/1993 | Von Medlin . |
| 5,277,805 | 1/1994 | Ferguson . |
| 5,279,329 | 1/1994 | Pippel ............................. 137/625.29 |
| 5,290,439 | 3/1994 | Buchwald . |
| 5,290,442 | 3/1994 | Clack . |
| 5,320,752 | 6/1994 | Clack et al. . |
| 5,324,423 | 6/1994 | Markham . |
| 5,344,558 | 9/1994 | Kool ................................. 210/282 |
| 5,372,781 | 12/1994 | Hallett et al. ..................... 422/186.3 |
| 5,393,419 | 2/1995 | Tiede et al. ....................... 210/192 |
| 5,698,091 | 12/1997 | Kuennen et al. ................. 210/87 |

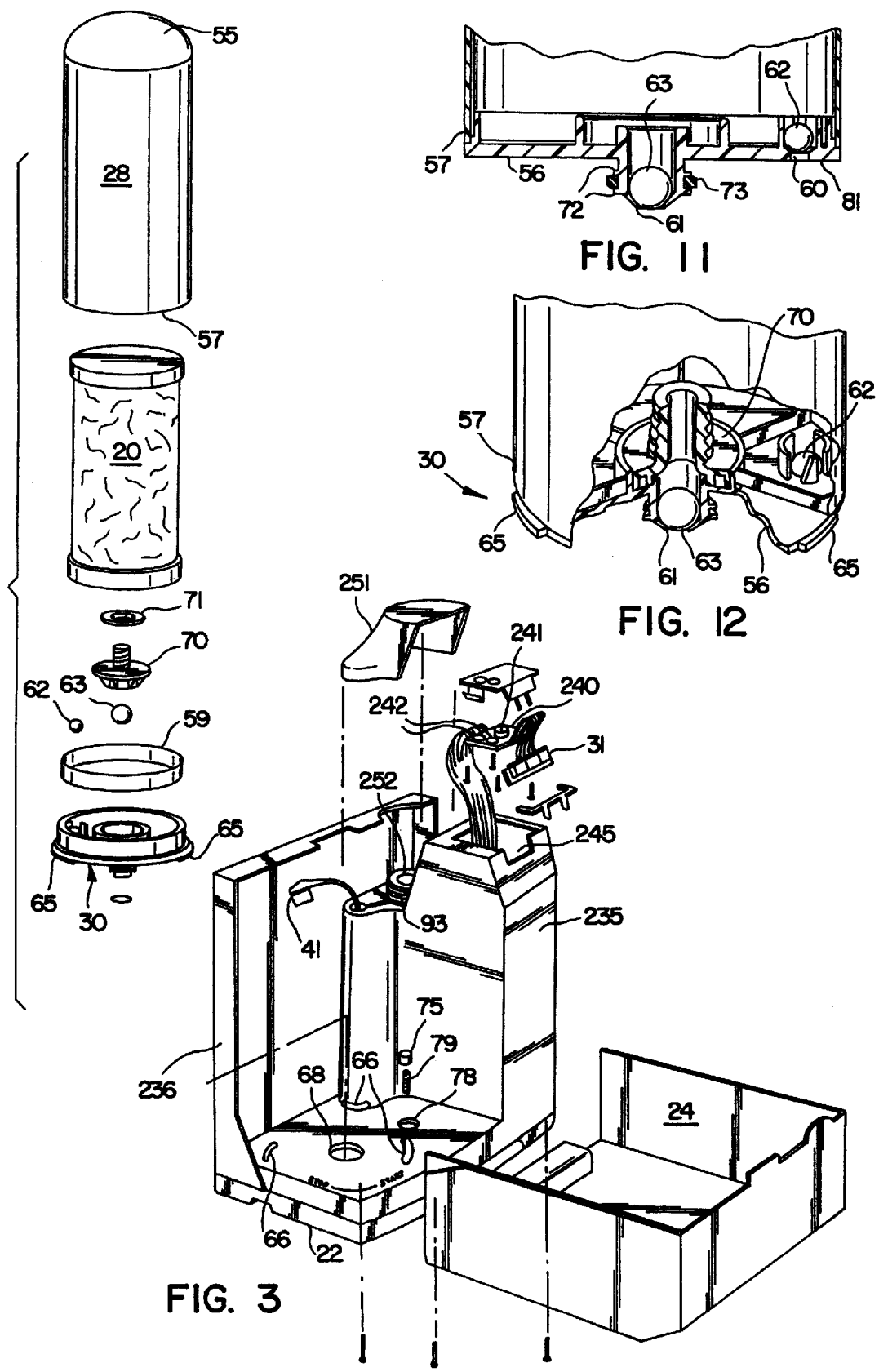

HOME WATER PURIFICATION SYSTEM

This is a continuation of application Ser. No. 08/479,430, filed Jun. 7, 1995 (now abandoned), which is a divisional of application Ser. No. 08/035,011, filed Mar. 22, 1993 (now U.S. Pat. No. 5,536,395).

BACKGROUND OF THE INVENTION

1. Field of the Invention

The present invention relates generally to home water purification systems and, more particularly, to a high performance, self-contained, point of use water purification unit that features a replaceable activated carbon filter, a replaceable ultraviolet radiation source and a diagnostic system that signals when the unit requires maintenance.

2. Related Cases

The following related patent applications are directed to different aspects of the water treatment system of the present application. FAUCET DIVERTER VALVE, U.S. Pat. No. 5,279,329, issued Jan. 18, 1994. Ornamental design for FAUCET DIVERTER VALVE, U.S. Pat. No. Des. 348,722, issued Jul. 12, 1994. WATER TREATMENT SYSTEM BULB STATUS MONITOR CIRCUIT, U.S. Pat. No. 5,401,394, issued Mar. 28, 1995. UV BULB INTENSITY CONTROL FOR WATER TREATMENT SYSTEM, U.S. Pat. No. 5,324,423, issued Jun. 28, 1994. ULTRAVIOLET LAMP ASSEMBLY FOR WATER PURIFICATION, U.S. Pat. No. 5,393,419, issued Feb. 28, 1995. WATER FILTER CARTRIDGE, U.S. Pat. No. 5,344,558, issued Sep. 6, 1994. Ornamental design for WATER PURIFIER, Ser. No. 07/931,288, filed Aug. 17, 1992. The disclosures of these related patent applications are hereby incorporated by reference.

DESCRIPTION OF THE RELATED ART

In the industrial arts, it is known to use an activated charcoal filter in combination with a radiation source to filter and purify water. For example, such systems are used in the production of bottled water. The adaptation of this technology to home use has been difficult. Industrial systems are large, expensive and require special knowledge and tools to maintain. The expense of these systems is often due to the fact that they are designed to process water volumes many times larger than those required for home use. Other challenges encountered when designing such a water treatment system for home use stem from the varying operating conditions in each home. For example, water quality, water line pressure, water demand and the sophistication of the user will vary in different homes.

Some water purifiers intended for home use are known which combine activated carbon filters with an ultraviolet (UV) radiation source. However, these home units have had a limited success due to inherent problems with their design that make maintenance of the units by the homeowner difficult and inconvenient. This can result in a water purification unit that, in time, operates only marginally if at all. Where the water purification unit is being used with a source of drinking water that contains contaminants or microbiological activity, this lack of maintenance can have serious consequences.

The effectiveness of radiation in the killing of microorganisms is dependent on a number of factors. One important factor is the status of the source of radiant energy. For example, the performance of most known ultraviolet discharge bulb designs degrades with time. It is therefore desirable to monitor the radiant energy source and alert the user if there is a malfunction. Some artisans have provided a removable housing cover for inspecting wiring and other electrical connections, yet have not provided a safe and convenient way of removing the radiation source without first removing an array of electrical connections and/or structural members. Thus, it is desirable to provide a substantially self-contained radiant energy source which is easy and safe to replace when there is a malfunction.

Another factor that is important in the kill rate of microorganisms is the performance of the carbon filter which removes contaminants from the water prior to irradiation. The effectiveness of radiation in the killing of microorganisms is dependent on the clarity of the water. If any significant particulate contamination defeats the carbon filter, such contamination can mask or protect the microorganisms from killing radiation. Thus, filter design should be optimized to provide the highest quality water for the irradiation.

All filters have a limited useful lifespan after which contaminants break through the filter. Since the kill rate of the radiation is dependent on the performance of the filter, it is desirable to provide a filter monitor to alert the user when the filter has reached the end of its useful life. While prior artisans have provided techniques for opening a pressure vessel containing a carbon filter used in prior art water purification systems of this type, such techniques are cumbersome and somewhat burdensome for the user because water connections must be removed and a seal broken on the pressure vessel. Further, the user is required to handle a wet filter body covered with contaminants. Thus, it is desirable to provide a substantially self-contained filter cartridge which requires a minimum effort to replace when the filter monitor indicates that the filter has reached its end of life.

SUMMARY OF THE INVENTION

According to the present invention, these and other limitations in the prior art are overcome by the provision of a point of use water purification system for home use comprising a carbon block filter housed in a self-contained disposable pressure vessel for removing particulates and organic contaminants from water. The carbon filter is provided with a pore-size distribution, a polymeric binder and a radially inward flow path which optimizes filtration performance, provides ample water flow and maximizes water quality for enhancing microbiological kill rates. A source of radiant energy is provided for receiving filtered water and killing microorganisms. The source of radiant energy comprises a disposable ultraviolet discharge lamp or bulb having an elongate central axis. A diverter is provided to establish a plug flow of water about the discharge lamp for maximizing the exposure of microorganisms to ultraviolet energy and enhancing microbiological kill rates. A flow regulator is provided for regulating the flow of water through the water treatment system under varying line pressure conditions to reduce stress on the system, to ensure adequate exposure time of microorganisms to ultraviolet energy and enhance microbiological kill rates. A filter monitor is provided for monitoring the amount of water flowing through the filter and providing an indication to the user when the filter has reached its end of life. A filter quick-disconnect is provided for the user to quickly and easily change the self-contained filter or filter cartridge in response to an indication from the filter monitor. A radiant energy monitor is provided for monitoring the performance of the ultraviolet discharge bulb and providing the user with an indication when the UV bulb has reached its end of life. A radiant energy source quick-disconnect is provided for the user to change the UV discharge bulb in response to a signal from the radiant energy monitor that the discharge bulb has malfunctioned. The source quick-disconnect works in combination with an interlock for automatically disconnecting power to the system so the user can safely and easily change the UV bulb. The lifespan and performance of the UV discharge bulb is enhanced by providing a power supply circuit which automatically lowers electrical power to the UV bulb in the absence of a flow signal from the filter monitor indicating when the user is drawing water from the water treatment system, thus conserving electrical energy, preventing unnecessary heating of the water treatment system and the water contained therein, increasing the efficiency of the ultraviolet bulb when water is drawn from the system and maximizing microbiological kill rates.

BRIEF DESCRIPTION OF THE DRAWINGS

FIG. 3 is a partial exploded assembly of the water treatment system;

FIG. 11 is a partial side view in section of the filter cartridge;

FIG. 12 is a partial side perspective view partially in section of the filter cartridge;

DESCRIPTION OF THE PREFERRED EMBODIMENTS

Figure 1:
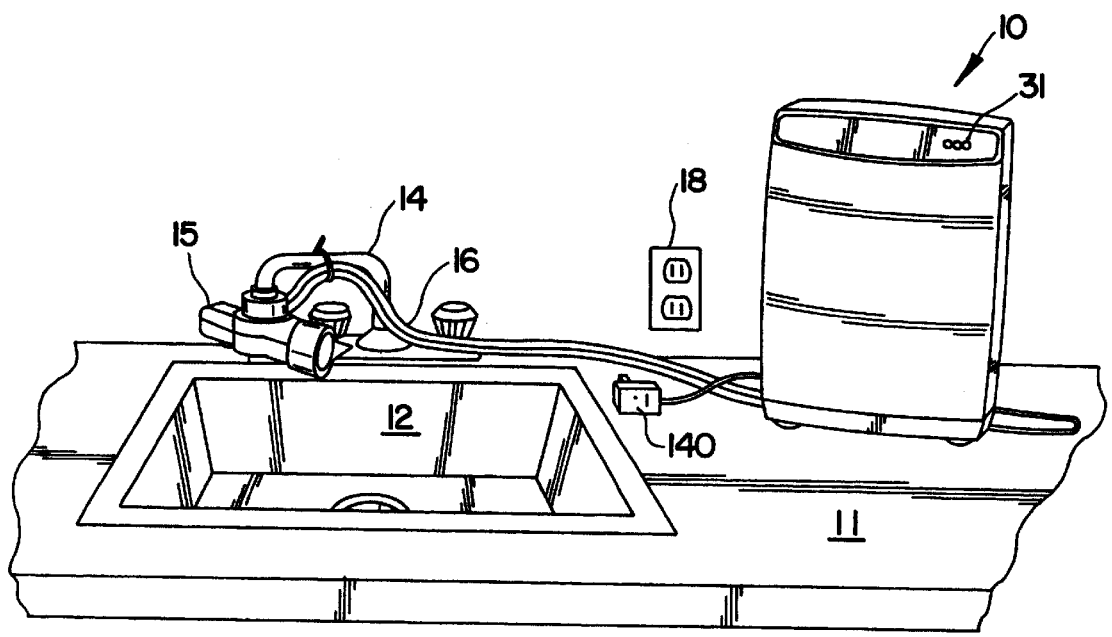
FIG. 1 is a perspective view of the water treatment system unit of the present invention installed at the point of use, namely, a kitchen countertop adjacent a kitchen sink.

With reference now to the figures, and in particular to FIG. 1, the point of use water treatment or purification system of the present invention is illustrated at 10. The water treatment system of the present invention is a so-called point of use water treatment system because it is designed for use in the home at the point where water is drawn for cooking and drinking purposes. For example, the water treatment system unit 10 is illustrated in FIG. 1 on top of a kitchen countertop 11 adjacent a sink 12 and a water faucet 14. The water treatment system 10 is connected to the outlet of the water faucet 14 by a diverter valve 15 and a pair of flexible tubular conduits 16. The water treatment system 10 is normally connected to a convenient source of electrical power such as the electrical outlet at 18.

Figure 2:
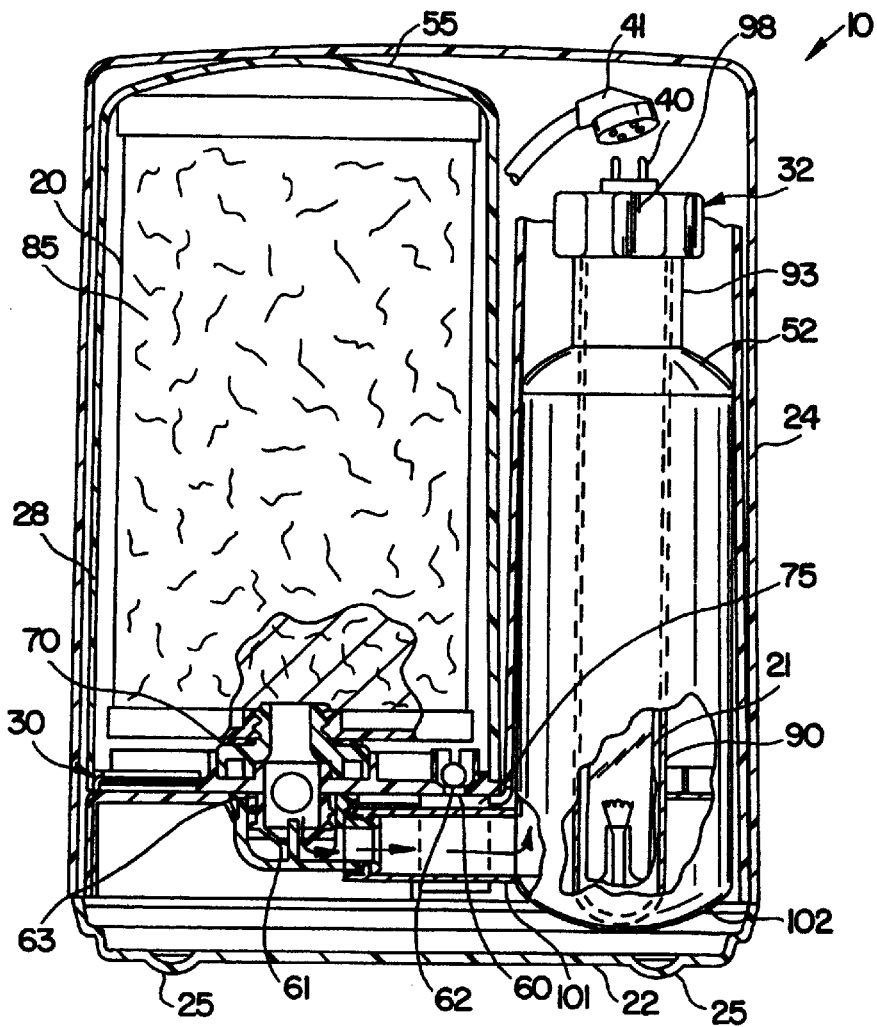
FIG. 2 is a partial elevation view partially in section of the water treatment system.

With reference now to the remaining figures, and in particular to FIG. 2, it is illustrated that the water treatment system 10 comprises a filter 20 for removing contaminants from water and a source of radiant energy 21 for killing any microorganisms that pass through the water filter 20. As hereinafter described, the filter 20 comprises a pressed carbon block filter having a specific pore-size distribution, binder and radially inward flow path which enhances the performance of the radiant energy source 21. As hereinafter described, the radiant energy source 21 comprises an ultraviolet discharge bulb or lamp for irradiating water which is passed around the bulb and killing any microorganisms contained in the water to purify the same. The filter 20 and UV discharge bulb 21 of the water treatment system 10 are disposed on a base 22 which is covered by a shroud or cover 24. In the present embodiment, the base and shroud are formed from a polymeric material and a plurality of legs 25 are molded into the bottom of the base 22 for engaging the surface of the countertop 11 illustrated in FIG. 1. The base 22 and shroud 24 are better illustrated in several of the other drawings including, for example, FIGS. 3, 4, 5 and 6.

Figure 5:
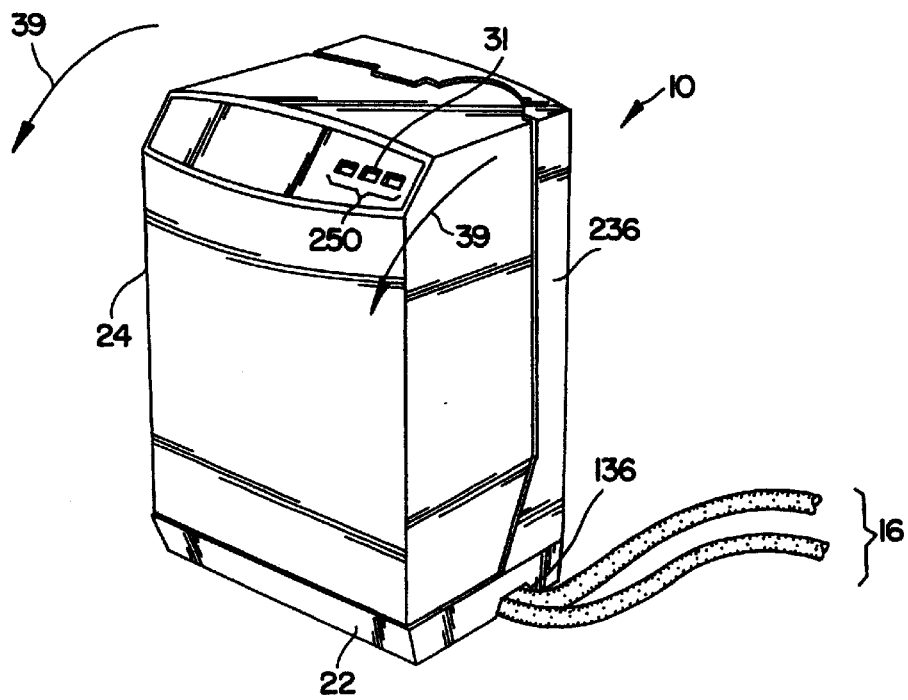
FIG. 5 is a top side perspective view of the water treatment system.

As hereinafter described, the water treatment system unit 10 further includes a filter monitor circuit for providing a measure of the accumulated amount of water flowing through the filter 20 and providing an indication of when the filter has reached its end of life. With reference again to FIG. 2, the filter 20 is housed within a disposable pressure vessel or filter cartridge 28 which includes a filter quick-disconnect or bayonet coupling at 30 for providing the user with the ability to quickly and safely change the filter in response to an indication from the filter monitor. The filter monitor provides a visual and/or audio signal to the user when the filter has reached the end of its useful lifespan. An audio enunciator is disposed within the base 22 and the base contains a light emitting diode (LED) display at 31 (FIGS. 1, 3 and 5). The filter cartridge is provided as a self-contained, preassembled unit including the carbon block filter 20, the pressure vessel 28 and the quick-disconnect 30. Similarly, as hereinafter described, a radiant energy monitor is provided for monitoring the performance of the UV discharge bulb 21 and providing an audio and/or visual indication of when the discharge bulb 21 has malfunctioned. A source quick-disconnect is provided at 32, which operates with a power interlock hereinafter described, so that the UV discharge bulb 21 can be easily and safely withdrawn from the unit when the shroud 24 is raised.

Figure 4:
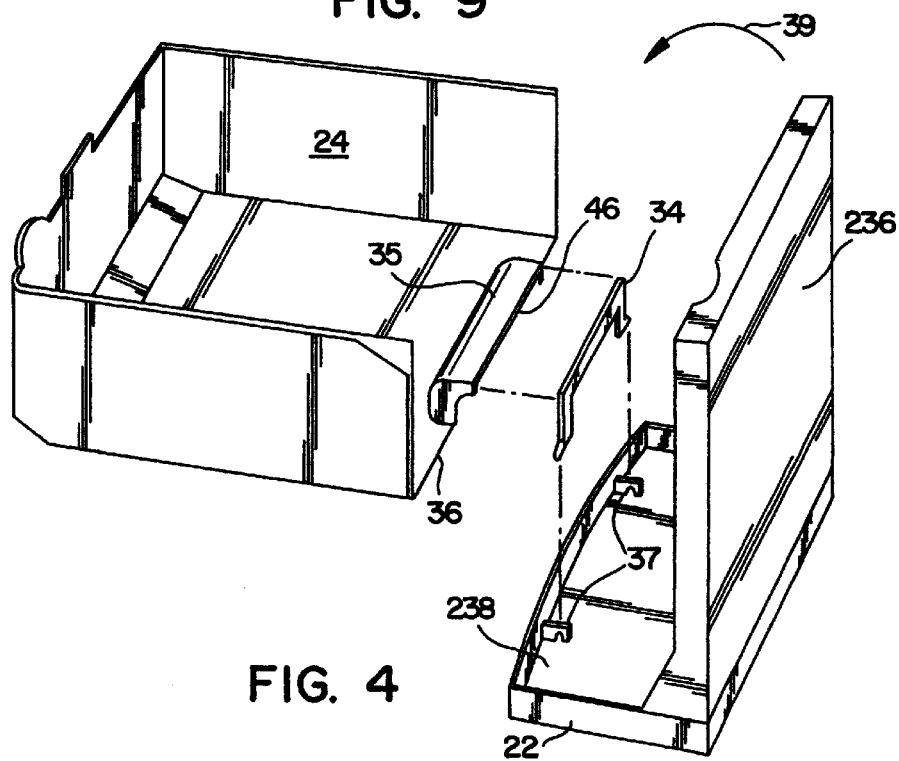
FIG. 4 is an exploded assembly of a base, shroud and hinge of the water treatment system.
Figure 6:
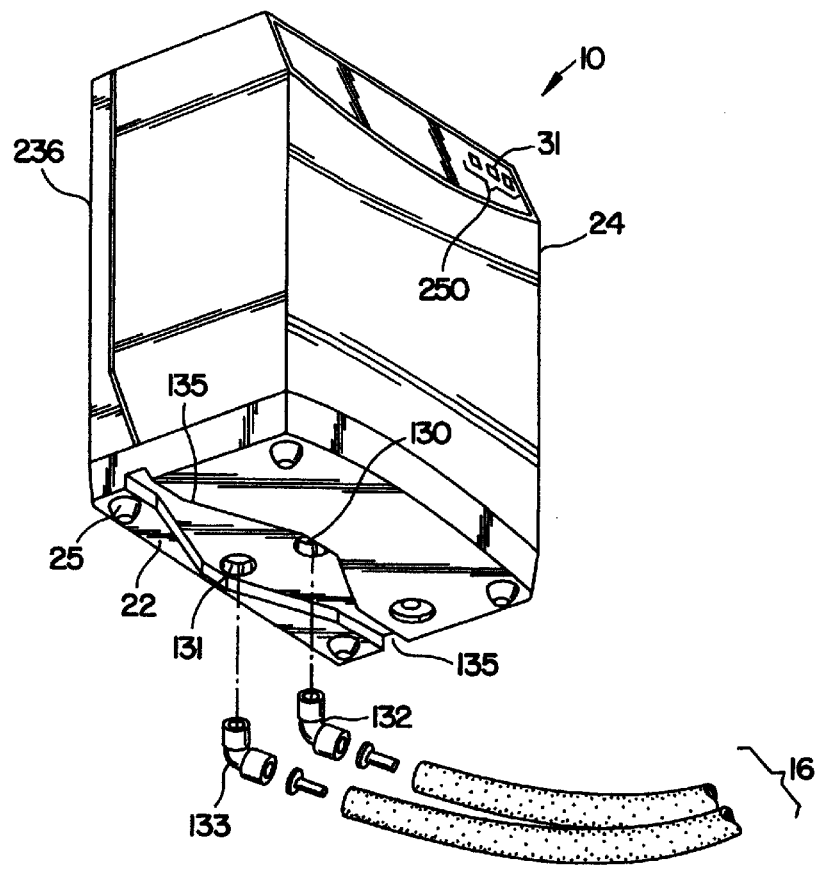
FIG. 6 is a bottom side perspective view of the water treatment system with an exploded assembly of an inlet and outlet water connection.

With particular reference now to FIG. 4, it is illustrated that the shroud 24 is pivotally mounted on the base 22 with a hinge 34. The hinge 34 is glued, welded or otherwise suitably secured to a boss 35 disposed on the bottom edge 36 of the shroud 24. The hinge 34 engages apertures at 37 which are molded into the base 22. The shroud 24 is thus raised by pivoting the shroud forward in the direction of the arrows 39 (FIGS. 4 and 5) to expose the two major subassemblies which are intended to be serviced by the user, namely, the filter cartridge and UV discharge bulb.

UV discharge bulbs require a ballast circuit for applying a starting voltage to the bulb and then applying a sustaining voltage to the bulb. This ballast circuit can present a danger of electrical shock or injury to an inexperienced homeowner that is required to access the interior of the unit for the purpose of changing the discharge bulb. For example, with reference to the other figures and in particular to FIG. 2, it is illustrated that the UV discharge bulb 21 contains on one end thereof a plurality of electrical contacts 40 which are engaged by an electrical plug 41. It should also be understood that the water treatment system unit 10 is normally used on a kitchen countertop where water is often present and there are ground fault discharge paths to plumbing fixtures, sinks, etc. To prevent the possibility of electric shock or discharge, the water treatment system of the present invention is provided with interlock switches, best illustrated at 45 in FIG. 7, for automatically disconnecting the source of radiant energy from a power supply when the shroud 24 is pivoted forward from the base 22 to access the filter and the source. More particularly, with specific reference to FIGS. 4 and 7, the forward edge 46 of the boss 35 disposed on the shroud 24 acts as a cam surface which engages forward facing actuators 49 on the interlock switches 45. The interlock switches 45 are disposed on a board which is received in a frame 50, also illustrated in FIG. 8, that is formed on a molded bracket 51 that also receives a source pressure vessel 52 to fix the same within the base 22 with the switches 45 forward facing for engagement with the forward edge 46 of the boss 35 on the shroud 24.

Figure 10:
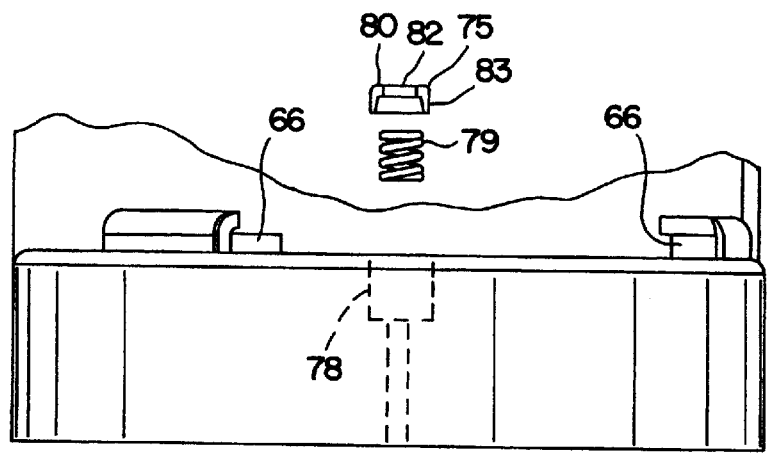
FIG. 10 is a partial side view of the base of the water treatment system unit illustrating a plurality of tangs which engage the filter cartridge.

With reference now again to FIGS. 2 and 3, and with additional reference to FIGS. 10, 11 and 12, it is illustrated that the filter 20 is disposed within a polymeric disposable pressure vessel 28 which includes a quick-disconnect or bayonet coupling at 30. The pressure vessel 28 is provided with a generally cylindrical cross section having a spherical end 55 which reduces stress concentrations in the pressure vessel that can lead to fatigue stress cracking and potentially dangerous water leakage in the presence of the electrical subassemblies and power supply which are associated with the radiation source and monitors. The opposite end of the generally cylindrical pressure vessel 28 is formed from a circular end cap 56 which is glued, welded or otherwise sealed to a circular end 57 of the cylindrical pressure vessel 28. An end weld seal 59, illustrated only in FIG. 3, is disposed therebetween. The end cap 56 is molded from a polymeric material and includes a water filter inlet at 60 and a water filter outlet at 61. Balls 62 and 63 cooperate with sealing surfaces formed in the molded end cap 56 to provide an inlet check valve and an outlet check valve, respectively. The inlet and outlet check valves automatically trap water and contaminants within the filter pressure vessel 28 when the filter cartridge or unit is removed or replaced by the user. This prevents the user from being exposed to any contaminants which have built up on the exterior of the carbon block filter 20 disposed therein and prevents water from being spilled within the shroud or base of the unit which contains electrical components.

With specific reference to FIGS. 3 and 12, the bayonet coupling 30 comprises a plurality of radial tangs 65 which are disposed on the end cap 56 of the pressure vessel 28. The tangs 65 are captured in a plurality of apertures 66 which are disposed in the base 22. When the user is provided with an indication that the filter cartridge must be replaced, the user need only pivot the shroud 24 forward to reveal the cylindrical pressure vessel 28. The user then grasps the pressure vessel, turns the pressure vessel approximately 45° counterclockwise to remove the tangs 65 from the apertures 66 and withdraws the filter cartridge from the water treatment unit. When replacing the water filter cartridge, the user need only align the water filter outlet 61 with an outlet port 68, best illustrated in FIG. 3, disposed in the base 22. Once the water filter outlet 61 is inserted in the port 68, the filter cartridge need only be rotated clockwise until resistance is felt and the tangs 65 are embedded in the apertures 66 in the base 22.

With specific reference to FIGS. 2, 3 and 12, the carbon block filter 20 is mounted within the pressure vessel 28 on the end cap 56 with a threaded connector 70 which communicates with the interior of the carbon filter 20 and is glued, welded or otherwise suitable secured in the end cap 56. The threaded connector 70 provides a fluid connection between the interior of the carbon block filter 20 and the water filter exit 61. A compressible, resilient elastomer seal 71, best illustrated in FIG. 3, is captured between the carbon filter 20 and the threaded connector 70 to provide a seal that prevents leakage of contaminated, untreated water into the filter exit 61.

With reference now to FIGS. 2, 3, 11 and 12, it is illustrated that the filter cartridge 28 of the water treatment system is provided with elastomeric sliding water inlet and water outlet seals which automatically provide fluid connections with the base 22. With specific reference now to FIGS. 11 and 3, it is illustrated that the water filter outlet 61 is molded into the end cap 56 with a pair of annular shoulders at 72 which capture an elastomeric, resilient sealing O-ring at 73. The O-ring 73 automatically engages the cylindrical sidewalls of the port 68 in the base 22 when the water filter outlet 61 is inserted in the port 68 to provide a fluid connection between the base 22 and the water filter cartridge 28.

With reference now to FIGS. 2, 3, 10 and 11, the water filter inlet, formed at 60 in the end cap 56, introduces water to the interior of the water filter pressure vessel 28 at a point which is radially displaced from the interior of the carbon filter 20 and the water filter outlet 61. This introduces water to the exterior of the water filter 20 establishing a radially inward flow path which results in superior filter performance. The sliding water inlet seal for the water inlet 60 is formed with an elastomeric, torroidal seal 75, best illustrated in FIG. 10, which is mounted in a water inlet port 78 disposed within the base 22. A compression coil spring 79 is captured between the torroidal seal 75 and a shoulder disposed in the inlet port 78. The top surface 80 of the torroidal seal 75 is thus spring-biased upwardly into engagement with the flat, bottom surface 81 of the end cap 56 of the cylindrical pressure vessel 28 to establish a sliding seal with the filter cartridge. The tangs 65 on the end cap 56 and the apertures 66 in the base 22 are provided with a geometry which automatically registers the water filter inlet 60 in the filter cartridge with the inlet port 78 in the base 22 when the tangs are rotated so that they are fully embedded in the apertures 66. This automatically registers the water filter inlet 60 with a seal inlet port 82 in the torroidal seal 75 to provide for the introduction of water to the filter cartridge. The torroidal seal 75 is also provided with an annular lip 83 which is biased outwardly into sliding engagement with the cylindrical walls of the inlet port 78 in the base 22 for sealing water therein. The design of the water filter cartridge is disclosed in further detail in co-pending application Ser. No. 08/017,773, filed Feb. 16, 1993 now U.S. Pat. No. 5,344,558 and entitled WATER FILTER CARTRIDGE. The disclosures of this related patent application are hereby incorporated by reference.

In this preferred embodiment, the carbon block filter 20 is constructed according to the teachings of prior U.S. Pat.

Nos. 4,753,728, 4,859,386 and 5,017,318. The disclosures of these prior patents are hereby incorporated by reference. Preferably, the filter 20 comprises a pressed carbon block formed from a carbon having a narrow pore-size distribution with a substantial percentage of the pore sizes in the micropore range. As used herein, the micropore range includes pores having a diameter of approximately 10 microns or smaller. The carbon block 20 may be provided with a carbon density that varies radially with the carbon being packed less densely near the surface of the block and more densely near the interior of the block. That is to say, the block may be provided with a radially variable density, the density increasing toward the interior of the block. This and the provision of a multi-layer scrim or screen overwrap 85 (FIG. 2) captures larger particulates on the outside of the carbon block filter to prevent masking of the carbon pores by larger particulates and thus increasing the useful lifespan of the filter block. The radially inward flow path also substantially increases the ability of the brittle pressed carbon block to withstand water pressure. It should be readily understood that any fracturing of the carbon block immediately creates water channels which defeat the filter and result in contaminant breakthrough. The carbon block is pressed with a binder comprising a low-melt index polymeric material having a melt index of less than one gram per ten minutes as determined by ASTM D1238 at 190° C. and 15 kilograms load whereby the polymer binder material tackifies at elevated temperatures without becoming sufficient liquid to substantially wet the carbon particles and mask the pores of the carbon which effectively reduces or eliminates the effective carbon surface. Forming the carbon block filter 20 with such a high molecular weight, low-melt index polymeric binder, and with the other features described herein and in the aforesaid patents, is considered essential to the performance of the radiation source which receives filtered water from the filter 20 because if any significant amount of contaminants or particulates defeat the filter 20, these contaminants or particulates can mask microorganisms from killing radiation.

Figure 13:
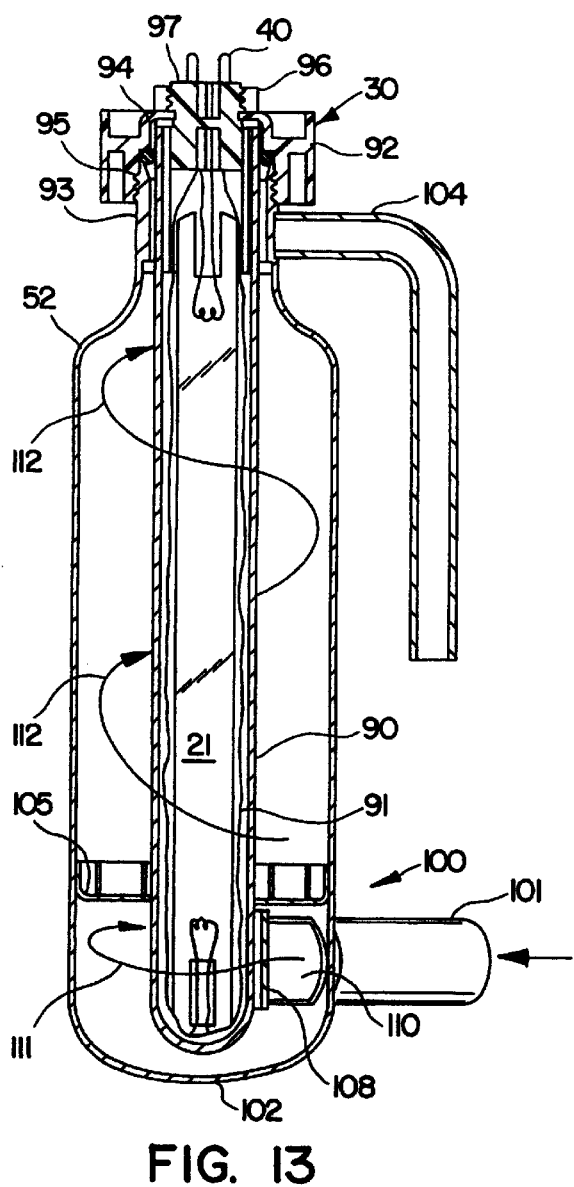
FIG. 13 is an elevation view partially in section of a radiation source of the water treatment system.

With reference again to FIG. 2, and now also to FIG. 13, it is illustrated that the water treatment system 10 of the present invention comprises an elongate source pressure vessel 52 disposed in the base 22 with an elongate ultraviolet discharge bulb or lamp 21 disposed therein. The lamp 21 is disposed within a glass quartz tube 90 which also contains conductors 91 which are connected to electrical contacts 40. The glass quartz tube 90 is rotatably mounted in a compression nut 92 which is received on the threaded neck 93 of the generally bottle-shaped cylindrical source pressure vessel 52. An O-ring seal 94 is trapped between the compression nut 92 and inwardly facing annular sloped surface 95 on the neck 93 of the bottle-shaped source pressure vessel 52 and the exterior cylindrical surface of the quartz glass tube 90, providing a sealing relationship between these members. A spring clip or threaded cap at 96 engages the end insulator 97 of the lamp 21 to rotatably mount the lamp 21 on the compression nut 92. The compression nut 92 includes a plurality of finger or hand-holds 98, best illustrated in FIG. 2, so that the compression nut 92 acts like a twist-off threaded bottle cap disposed on the top of the bottle-shaped source pressure vessel 52 with the O-ring 94 acting as a sliding elastomeric seal which automatically seals the top of the bottle-shaped pressure vessel.

With continued reference to FIGS. 2 and 13, upon receiving an audio or visual indication that the lamp 21 has malfunctioned, the user need only pivot the shroud 24 forward to reveal the compression nut 92 of the source quick-disconnect 32. The interlock switches heretofore described automatically disconnect electrical power supplied to the ballast power supply circuit and the lamp 21 so that the user can safely grasp the electrical plug 41 to disengage the same from the electrical contacts 40 extending from the top of the lamp 21. Thereafter, the user need simply grasp the compression nut 92 and twist the same counterclockwise until the threads are released and the lamp 21 and quartz tube 90 can be withdrawn as a unit from the top of bottle-shaped pressure vessel 52. The radiation source is replaced as an entire unit by inserting a new quartz tube and lamp with O-ring seal and compression nut attached thereto into the neck 93 of the bottle-shaped pressure vessel 52 and then turning the compression nut counterclockwise until it is firmly seated and in sealing engagement with the neck of the source pressure vessel. The electrical plug 41 is then reattached to the electrical connectors 40 extending from the top of the lamp 21 and the shroud 24 is pivoted forward to close the unit and resume normal operation.

Figure 14:
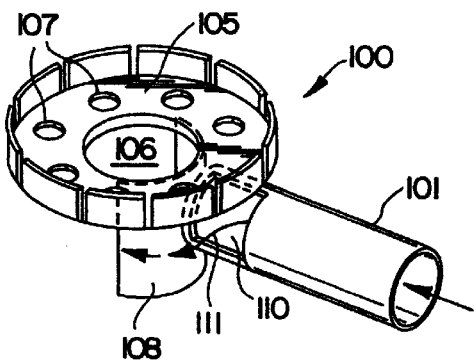
FIG. 14 is a perspective view of a diverter used to establish plug flow in the radiation source of the water treatment unit.

With specific reference now to FIGS. 13 and 14, it is illustrated that the source pressure vessel 52 further comprises a diverter, generally illustrated at 100, for establishing a plug flow about the elongate ultraviolet discharge lamp 21. The diverter 100 is associated with the source pressure vessel inlet 101 which is disposed on one end 102 of the elongate pressure vessel 52. The end 102 of the pressure vessel 52 is disposed distally or opposite of the neck 93 or other end of the pressure vessel 52 where the source pressure vessel outlet 104 is disposed. The source pressure vessel 52, the diverter 100, source pressure vessel inlet 101 and source pressure vessel outlet 104 are formed from stainless steel and are welded together. Stainless steel is the preferred material to withstand the water pressure and the radiation emanating from ultraviolet lamp 21. This steel structure is also opaque to provide a high level of protection for the remainder of the system which includes components which degrade when subjected to UV radiation and to protect the user's skin and eyes. The diverter 100 comprises a radial baffle 105 containing a central aperture 106 through which the quartz tube 90 and the lamp 21 extend. A circular array of apertures 107 are provided for controlling the flow of water from the source pressure vessel inlet 101 to the interior of the elongate bottle-shaped pressure vessel 52.

With continued reference to FIGS. 13 and 14, the inlet tube 101 of the source pressure vessel abuts a diverter plate 108. The tube 101 is provided with an outlet aperture 110 disposed on one side of the tube and inside of the source pressure vessel 52. Water entering the source pressure vessel through the inlet tube 101 thus exits the aperture 110 inside of the pressure vessel and is directed in a tangential path by the plate 108. This tangential entry is generally illustrated by the arrows 111 in both FIGS. 13 and 14. The radial baffle 105 prevents any substantial mixing or turbulence in the water and creates a plug-like spiral flow condition illustrated by the arrows 112 in FIG. 13. This plug-like spiral flow condition is important to the operation of the water treatment system as a water purifier because it prevents turnover or mixing of the water inside of the pressure vessel 52 in a way that permits microorganisms to be quickly and accidently ejected from the opposite end of the source pressure vessel 52 through source pressure vessel exit tube 104 without receiving a killing dose of radiation. This laminar plug-like spiral flow condition not only ensures adequate contact time between the radiation emanating from the ultraviolet lamp 21 and any microorganism, but it also turns the microorganism, or any particulate upon which the microorganism is carried, to be sure that the microorganism is properly exposed to killing radiation. This turning motion may also be useful to expose any area of the microorganism that is particularly sensitive to UV radiation.

It must be understood that this means for providing a plug flow about the elongate ultraviolet discharge lamp 21 may take other embodiments. For example, a spiral glass or polymeric tube may be used to channel water in a spiral path from a water inlet disposed at 101 to a water outlet disposed at 104 at the opposite end of the elongate lamp 21. In fact, it has been found that Teflon® tubing coiled about the lamp in a spiral pattern can be provided with a sufficient wall thickness to withstand water line pressures while having adequate ultraviolet transmissibility to achieve excellent kill rates. Thus, the means for providing a plug flow about the elongate ultraviolet discharge lamp may embody a number of alternative structures. The design of the radiation source pressure vessel and the ultraviolet lamp is the subject of related patent application Ser. No. 08/016,140, filed Feb. 10, 1993, now U.S. Pat. No. 5,393,419, entitled ULTRAVIOLET LAMP ASSEMBLY FOR WATER PURIFICATION and the disclosures of this related application are hereby incorporated by reference.

With reference now again to FIG. 1, it is illustrated that the water treatment system 10 of the present invention further comprises the diverter valve illustrated at 15. The diverter valve 15 is particularly adapted for mounting on the water outlet of a household water faucet 14. Although it should be understood that it is possible to use the water treatment system unit 10 without the diverter valve by connecting the system to a dedicated drinking or cooking water faucet. It is assumed, however, that in most homes only a single water faucet is available both for cleaning and drinking water and, thus, a diverter valve which allows the use of unpurified water for cleaning purposes is desirable. A diverter valve particularly adapted for use with the water treatment system of the present invention is disclosed in related patent application Ser. No. 07/977,161, filed Nov. 16, 1992, now U.S. Pat. No. 5,279,329, entitled FAUCET DIVERTER VALVE and the disclosures of this related application are hereby incorporated by reference. The ornamental design of this diverter valve is also the subject of patent application Ser. No. 07/930,182, filed Aug. 17, 1992, now U.S. Pat. No. Des. 348,722 entitled FAUCET DIVERTER VALVE. The disclosures of this design application are also incorporated herewith by reference.

Figure 15:
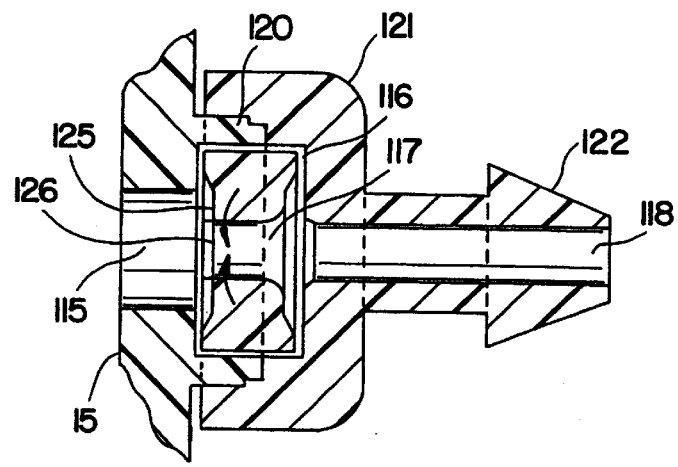
FIG. 15 is a cross section of a flow regulator in the water treatment system.

With reference now to FIG. 15, it is illustrated that in the preferred embodiment of the water treatment system of the present invention, the body of the diverter valve 15 (or an inlet port on the base 22) includes an untreated water outlet port 115 that includes a regulator 116 for regulating the flow of water through the water treatment system 10 under variable line pressure conditions. In the preferred embodiment, the regulator comprises an elastomeric grommet 116, the elastomeric grommet having a central opening or restriction port 117 through which water flows into a passage 118 that is connected to one of the two tubing pairs 16 that directs water from the faucet 14 to the water treatment system 10. The elastomeric grommet 116 is seated in an annular socket 120 which is normally formed on the body of the diverter valve 15 surrounding the untreated water exit port 115. The grommet 116 is encapsulated by fitting 121 which encompasses the annular socket 120 and is either glued or suitable welded thereto. The fitting 121 includes a spade-shaped tubing connector 122 which is pressed into the inside diameter of one of the two tubes 16 to direct water to the water treatment system 10.

With continued reference to FIG. 15, the port 117 in elastomeric grommet 116 presents a flow restriction for untreated water exiting the port 115 and entering the water treatment system 10. As line pressure increases, flow resistance through the port 117 in the grommet 116 increases and the pressure drop across the elastomeric grommet increases. This causes the elastomeric grommet to elastically deform, rotating a rounded edge 125 of the grommet 116 inwardly in the direction of the arrows 126 to act as an iris which automatically chokes flow to the water treatment system 10 as line pressure increases. As line pressure decreases, the pressure drop across the elastomeric grommet decreases and the elastomeric grommet relaxes allowing a corresponding proportional increase in flow. This flow regulator is important to prevent water from jetting through the water treatment system in the event that the system encounters unreasonably high line pressures, reducing noise in the water treatment system and insulating the water treatment system from sharp pressure increases which could lead to premature and potentially catastrophic failure of components within the water treatment system which are subjected to line pressure. Still further, this flow regulator enhances microbiological kill rates by controlling the rate of flow through the ultraviolet radiation source to provide good contact time between the microorganisms and the source of UV radiation and thus ensure excellent kill rates. Flow regulating grommets of the type disclosed herein are known in the industrial arts and are commercially available.

With reference again to FIGS. 5 and 6, it is illustrated that the water treatment system 10 of the present invention is provided with a base water inlet 130 and a base water outlet 131 in the bottom of the base 22. Each of the base water inlet and outlet is provided with a 90° elbow 132 and 133, respectively, which is rotatably mounted in the inlet and outlet ports 130 and 131 in the bottom of the base 22. The flexible inlet and outlet tubes at 16 are connected thereto so that the water treatment system unit 10 can be mounted on either of the left or the right side of a point of use water source such as a sink countertop. This is accomplished by rotating the elbows 132 and 133 to provide for the exit of the flexible tubes 16 from one or the other side of the water treatment system unit 10. Channel 135 is molded on the bottom surface of the base 22 to provide or ensure adequate clearance for the flexible tubes 16 from either the right or left sides of the unit 10. For example, in FIG. 5 the tubes 16 are illustrated exiting the underside of the unit 10 at 136.

Figure 9:
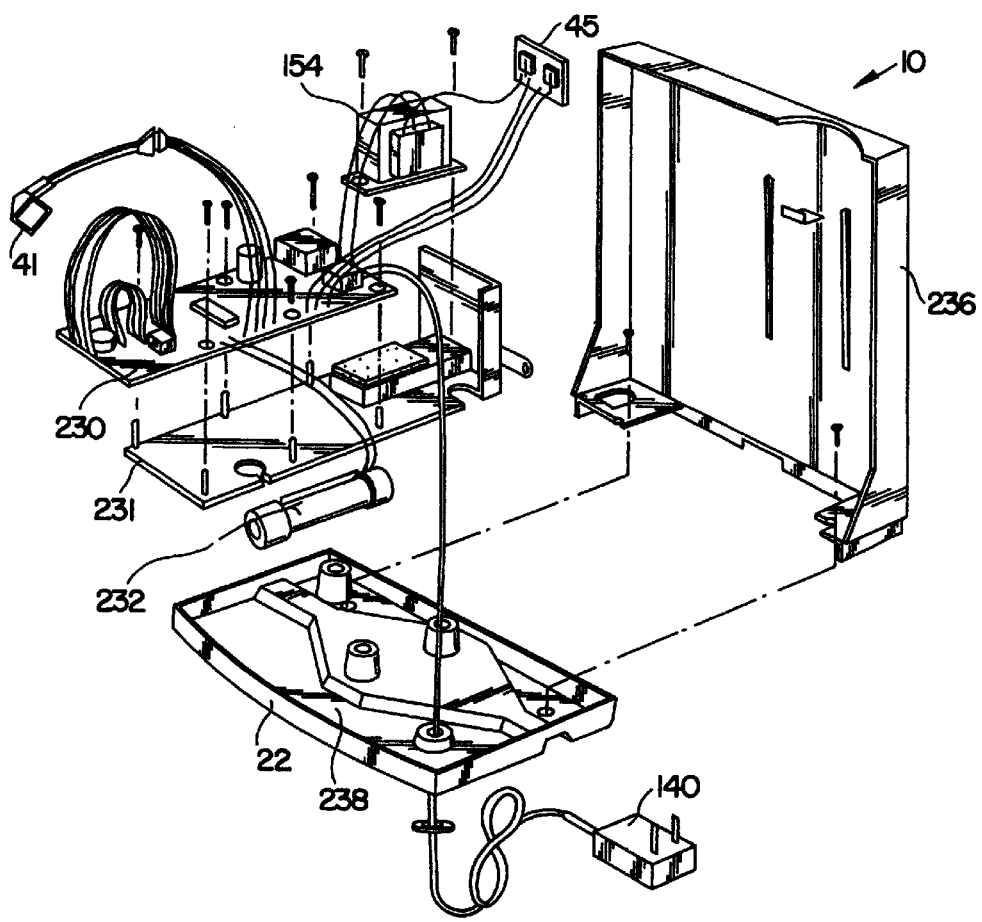
FIG. 9 is an exploded assembly of the base and main circuit board of the water treatment system unit.

In FIGS. 1 and 9 it is illustrated that an appliance leakage current interrupter 140 is supplied on the power cord for the water treatment system unit 10 for automatically disconnecting the ballast circuit and source of radiant energy contained within the water treatment system 10 from the home power supply when an electrical leakage path is present in the water treatment system. Such appliance leakage control interrupters are known in the art and are commercially available.

Figure 16:
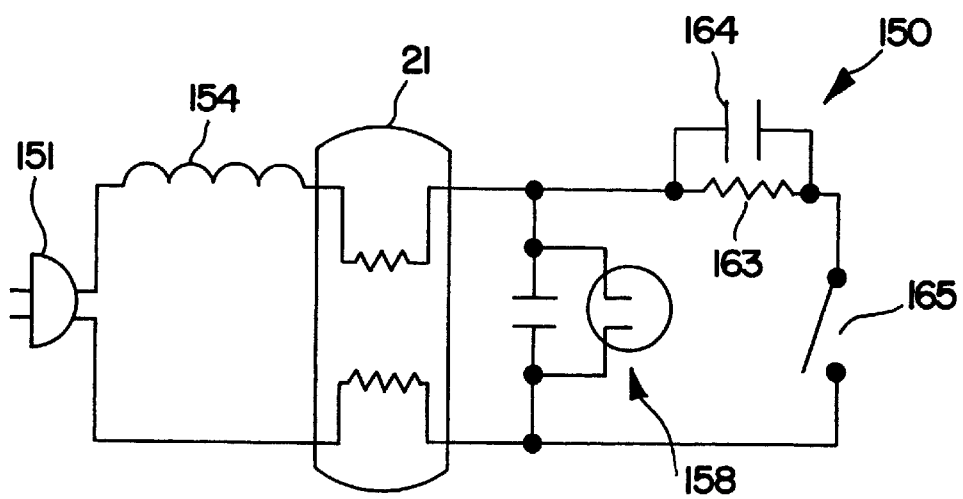
FIG. 16 is a schematic illustrating a UV bulb intensity control circuit for the water treatment system.

With reference now to FIG. 16, a UV bulb intensity control circuit for the water treatment system of the present invention is generally illustrated at 150. Two considerations factor into the intensity control of the UV lamp schematically illustrated at 21. First, it is desirable to operate the lamp 21 at maximum intensity to achieve the maximum kill rate whenever water is flowing through the water treatment unit. Secondly, it is desirable to reduce the UV light intensity whenever water stops to prevent excessive warming of the water stagnated within the unit. Another problem associated with thermal soaking of the unit is that when the temperature of the lamp 21 is allowed to increase there is a corresponding decrease in the UV output of the lamp. Thus, it is most desirable to have the UV lamp 21 dwell at a lower power setting (still high enough to sustain UV discharge) when no water is being drawn through the unit so that the bulb will operate at a lower temperature when full power is applied to the bulb to supply a high UV output when water is drawn through the unit.

A power connection to a household power source is schematically illustrated at 151 and an inductive ballast is illustrated at 154. A starter circuit of a type well-known in the art is schematically illustrated at 158. An intensity control circuit is provided which comprises an RC circuit including resistance 163 and capacitance 164 connected in parallel with the lamp 21 and a normally open relay 165. The normally open relay 165 is controlled by a flow switch contained within the water treatment system so that the relay switch 165 is normally open when water is flowing in the unit. Thus, when water is flowing in the water treatment system, the power circuit comprising elements 151 and 154 operate in a conventional fashion to provide full intensity to the UV lamp 21. However, when the relay switch 165 is closed, current is shunted through parallel RC circuit elements 164 and 163 to reduce bulb intensity. This circuit is disclosed in further detail in related patent application Ser. No. 08/016,594, filed Feb. 11, 1993, now U.S. Pat. No. 5,324,423, entitled UV BULB INTENSITY CONTROL FOR WATER TREATMENT SYSTEM and the disclosures of this related application are hereby incorporated by reference.

Figure 17:
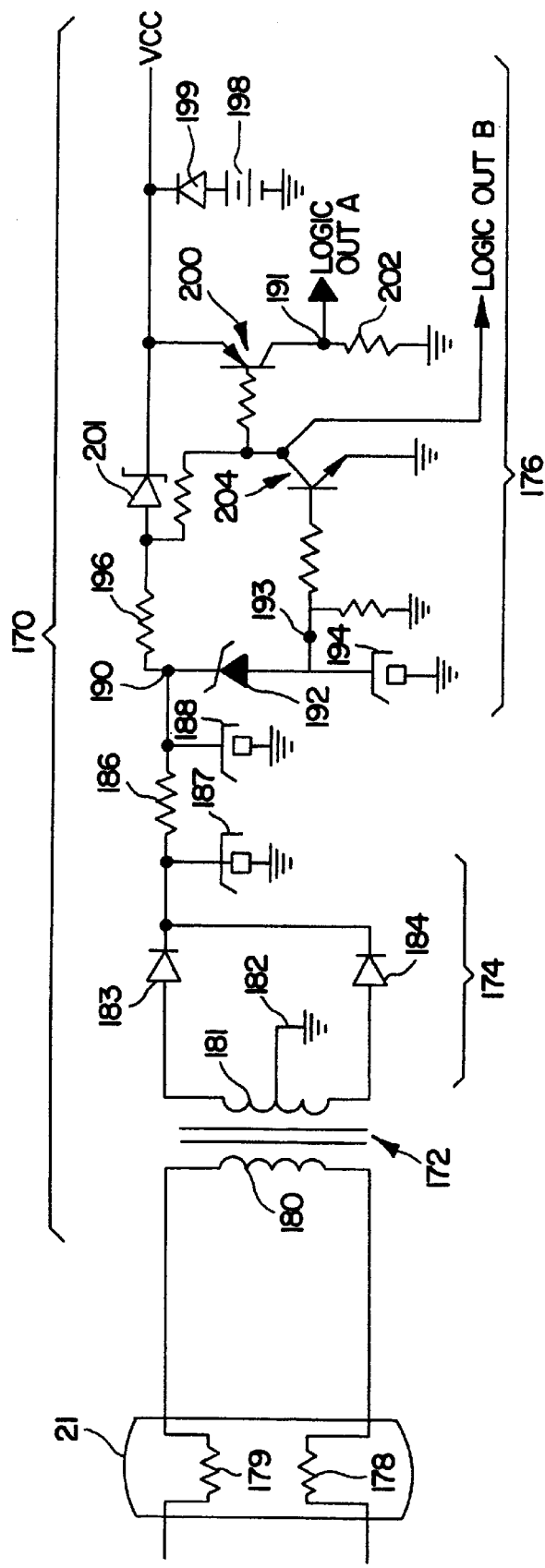
FIG. 17 is a schematic illustrating a UV bulb status monitor circuit for the water treatment system.

With reference now to FIG. 17, a circuit is generally illustrated at 170 for monitoring the status of the UV lamp 21. Clearly, the effectiveness of radiation in the killing of a microorganism depends upon the status of the UV bulb 21. The bulb may not operate properly for a variety of reasons. For example, the bulb may burn out, break or power to the bulb may be interrupted. Thus, a radiation source or UV lamp monitoring circuit is provided which includes a voltage detection circuit coupled in parallel across the bulb or lamp 21. The monitoring circuit, generally illustrated at 170, includes a means for emitting a status signal when the voltage is undesirably high (as might be associated with a burned out or a broken bulb) or when the voltage is undesirably low (as might be associated with a short-circuit). The status of the bulb 21 is indicated via status signals that are in a format compatible with a CMOS microprocessor or logic inputs. Such an arrangement enables the bulb status to be processed by a microprocessor which would then indicate to the consumer by audio and/or visual signals the status of the bulb.

In FIG. 17, the components of FIG. 16 other than the lamp 21 have been omitted for clarity. Accordingly, in FIG. 17 the lamp 21 is illustrated in conjunction only with the lamp status monitor circuit 170. The monitor circuit 170 includes a transformer 172, a rectification circuit 174 and a signal generation circuit 176. The transformer 172 is coupled in parallel with the UV lamp 21 to step down the voltage across the lamp. The transformer secondary current is rectified by the circuit 174 and applied to the circuit 176. A signal is outputted in CMOS compatible form by the circuit 176 whenever the voltage across the lamp 21 is undesirably high or undesirably low. The voltage which the lamp 21 inherently seeks is referred to as the sustaining voltage. The sustaining voltage typically is selected to be approximately one-half of the line voltage. Two conditions can drastically change the sustaining voltage. First, when there is no current through the bulb there is no voltage drop across the inductor 154 (illustrated in FIG. 16) and the voltage across the bulb 21 is the full line voltage. Second, if the starter shorts out, the voltage across the bulb is zero.

Thus, the bulb status is monitored by detecting for these three distinctly different voltage levels (i.e., line voltage, sustaining voltage and zero voltage) across the bulb. Sustaining voltage indicates that the lamp 21 is functioning properly. Line voltage indicates that the bulb is burned out, broken or missing. Zero voltage indicates that the starter has shorted out or that power is interrupted.

With continued reference to FIG. 17, the impedance of the power supply ballast 154 (FIG. 16 only) is selected to reduce the current through the UV bulb to an ideal value for which the bulb is designed. The bulb 21 is a conventional gas discharge UV bulb including a pair of filaments 178 and 179. The filaments are connected in series with the ballast 154, the bulb acting as a voltage regulator. As the impedance of the ballast increases, the current through the bulb decreases. Any increase in current decreases the impedance of the bulb, thus maintaining the voltage across the bulb at an essentially constant value. Finally, the starter circuit 158 (FIG. 16 only) is also of a conventional construction and is connected in series between the filaments 178 and 179 of the lamp 21. The transformer 172 includes a primary 180 connected in parallel across the bulb 21. The secondary 181 of the transformer is center tab grounded at 182. The transformer 172 therefore steps down the voltage across the bulb 21.

With continued reference to FIG. 17, the rectification circuit 174 is conventional and includes a pair of diodes 183 and 184 electrically connected to opposite sides of the secondary 181. The outputs of the diodes are connected in series with a resistor 186 having grounded capacitors 187 and 188 on either side thereof. Accordingly, a DC voltage appears at node 190 which is directly proportional to the AC voltage across the lamp 21.

With continued reference to FIG. 17, the signal generation circuit 176 generates a logic output at node 191 which can be used by a microprocessor operating the diagnostic system. Node 190 is connected through a zenner diode 192, a node 193 and a capacitor 194 to ground. The conducting voltage of the zenner diode is selected so that the voltage generated by the rectification circuit 174 will not cause the diode to conduct when the bulb is at normal sustaining voltage. Node 190 is also connected through resistor 196 and diode 199 to the supply voltage VCC. A battery backup 198 is connected through diode 199. Transistor 200 is series connected with resistor 202 between VCC and ground. The output of the transistor 200 at node 191 is the CMOS LOGIC OUT A point. Transistor 204 switches transistor 200 and, therefore, LOGIC OUT B under the control of the signal at node 193.

With continued reference to FIG. 17, when the primary of the transformer 172 (i.e., the bulb voltage) goes to the line voltage (meaning the bulb is not lit or is trying to light), the zenner diode 192 turns on. The signal at node 193 turns on transistors 204 and 200 to provide a high logic output at LOGIC OUT A and low logic output at LOGIC OUT B. When the primary voltage of the transformer 172 goes to zero volts (meaning shorted starter or no power), current will be supplied to the circuit 176 by the battery backup 198 as diode 199 will be allowed to conduct because of the absence of the rectified supply voltage. In such case, both LOGIC OUT A and LOGIC OUT B are low. When the bulb is at sustaining voltage (meaning bulb lit), the logic output at LOGIC OUT A is low and the logic output at LOGIC OUT B is high.

Hence, the output at LOGIC OUT A is high if the voltage is abnormally high and the output at LOGIC OUT B is low if the voltage is either abnormally low or abnormally high.

As explained, abnormally high voltage indicates no power or a shorted starter. Abnormally low voltage means a burned out bulb, a broken bulb or a missing bulb. In any of these events, the consumer is notified by an audio and/or visual signal driven by a microprocessor that receives the A and B LOGIC signals. On the other hand, if the logic output at LOGIC OUT A is low, and the logic output at LOGIC OUT B is high, then the bulb is operating normally.

Figure 18:
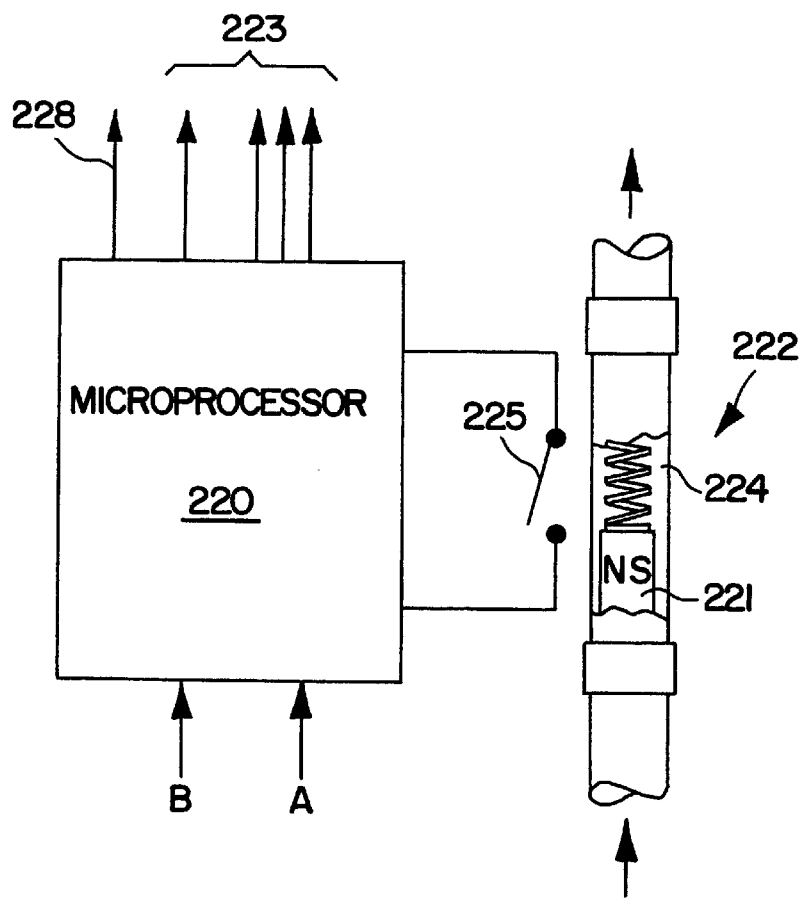
FIG. 18 is a schematic of a microprocessor and flow switch which comprises a filter cartridge status monitor and which drives the audio and visual diagnostic output.

With reference now to FIG. 18, it is illustrated that the LOGIC A and B signals are received by a CMOS microprocessor 220 which processes this logic information as well as input from a magnet actuated reed switch or flow switch schematically illustrated at 222. Driver circuits actuated by the outputs schematically illustrated at 223 are controlled by the microprocessor 220 which processes information obtained from the logic inputs A, B and the magnetically actuated reed switch 222 to provide the consumer with audio and/or visual information in the form of a blinking or constantly lit LED display concerning the status of the UV lamp. LOGIC signals A and B, as hereinafter described, are directly converted into a lamp status LED display which indicates when any of the aforementioned lamp fault conditions is present. An audio signal, buzzer or beep may also be provided to alert the user of the lamp malfunction.

The flow switch schematically illustrated at 222 is known in the art and is preferred to be the type illustrated in U.S. Pat. No. 5,070,220, issued Dec. 3, 1991 and entitled FLOW SWITCH CONSTRUCTION, the disclosure of which is hereby incorporated by reference. Briefly, the flow switch comprises a magnet 221 which is biased by spring 224 to a position distal from reed switch 225. The reed switch 225 may be normally closed or normally open, but in this case is normally open so that when water pressure is applied to the head of a piston containing magnet 221, to displace the same in the direction of the reed switch 225, the reed switch 225 is closed providing a signal to the microprocessor 220 that flow is present in the water treatment system. This signal is then used by the microprocessor 220 to drive via output 228 the normally closed relay 165 of the UV bulb intensity control circuit illustrated in FIG. 16.

The flow switch 222 and the microprocessor 220 also comprise the filter monitor circuit of the present invention since the useful lifespan of the filter cartridge can be directly related to the total accumulated water flow through the water treatment system unit. Thus, whenever the reed switch 225 is closed it is assumed that water is flowing through the filter cartridge and a register in microprocessor 220 connected to a clock provides a measure of total accumulated flow based on the total accumulated time that the reed switch 225 is closed. When the total accumulated time reaches a predetermined set time within the microprocessor that is associated with the end of the useful lifespan or the end of the life of the filter cartridge, one or more of the audio or visual drivers 223 are used to provide the consumer with an audio and/or visual indication that the filter cartridge has been exhausted and has reached its end of life.

Figures 7, 8:
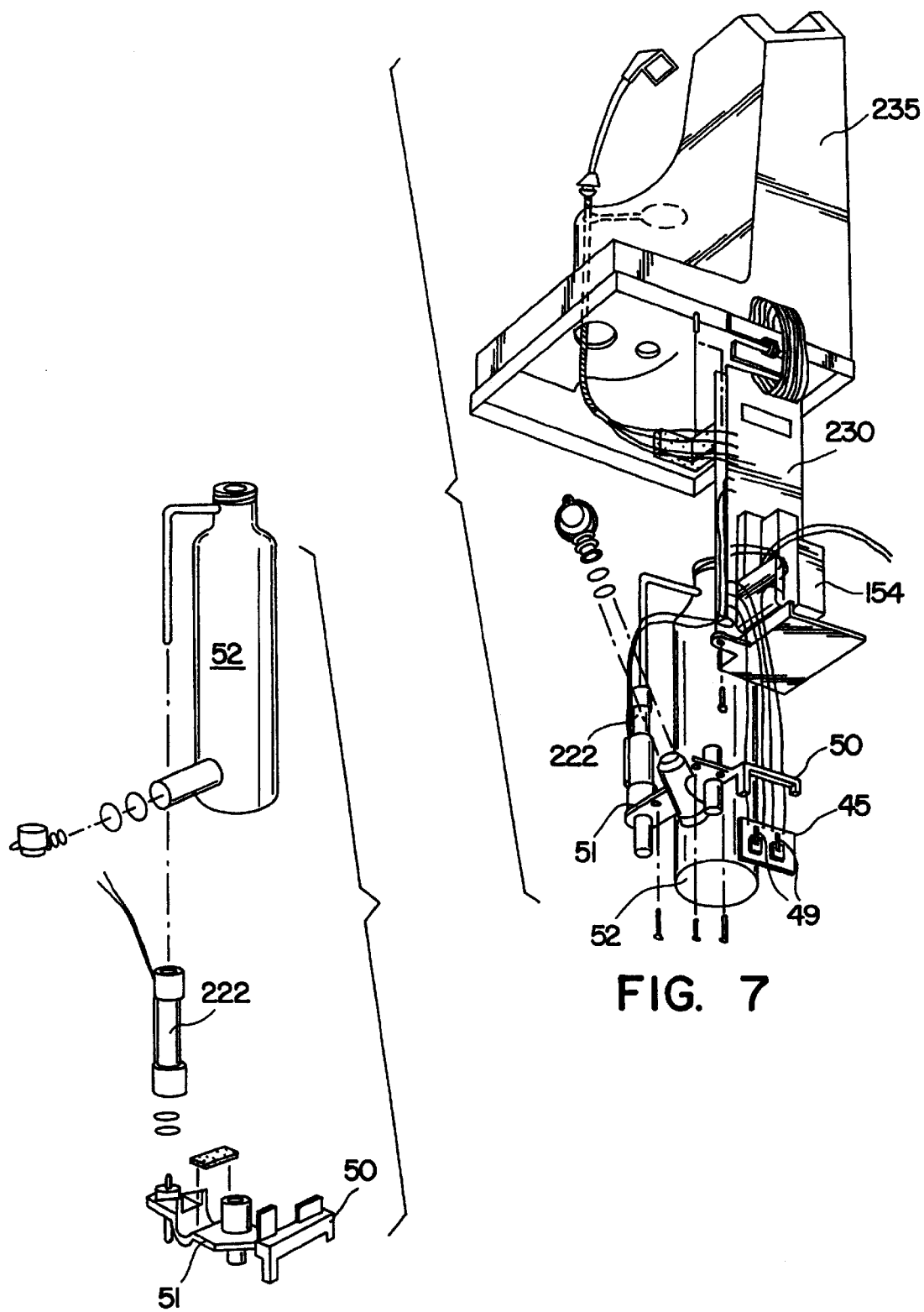
FIG. 7 is an exploded assembly of the base, a main circuit board and a source pressure vessel of the water treatment system.
FIG. 8 is an exploded assembly of the source pressure vessel and a flow switch of the water treatment system.

With reference now to the other figures, and in particular FIGS. 7 and 9, it is illustrated that the UV bulb intensity control circuit illustrated in FIG. 16, the UV lamp monitor illustrated in FIG. 17 and the filter monitor illustrated in FIG. 16, are mounted on a main circuit board 230 that is fastened to an interior bulkhead 231. The ballast 154 is also mounted on the main circuit board. The UV pressure vessel subassembly, which also includes the flow switch 222 and mounting bracket 51 (FIG. 8) are also received and fastened to the bottom of the bracket 231, as best illustrated in FIG. 7. The interlock switches 45 are then received in frame 50 of bracket 51 and the entire assembly, including the main circuit board 230, the ballast 154 and the source pressure vessel subassembly are inserted into the bottom of a tower 235, best illustrated in FIG. 7. The tower 235 forms the top portion of the base 22 along with an upstanding, cooperating back 236, best illustrated in FIGS. 4 and 9. The tower 235 and the back 236 are fastened together and fastened to the bottom plate 238 (best illustrated in FIGS. 4 and 9) of the base 22 to fully encapsulate all of the major electrical subassemblies, including the UV source pressure vessel. Only the threaded neck 93 of the UV source pressure vessel extends from the top of the tower 235 (FIG. 3).

With reference now also to FIG. 3, it is illustrated that an enunciator board 240, which is electrically connected to the main circuit board 230, is also mounted in the top of the tower 235. The board 230 includes driver circuits for LED display 31, an audio enunciator or buzzer 241, and pushbutton resets at 242 for resetting the monitor circuits contained on the main circuit board 230. The LED display 31 includes three different color LED arrays or lamps, one red lamp for indicating the status of the ultraviolet lamp, one orange lamp to indicate the status of the filter, and one green lamp to indicate the operating status of the water treatment system. These three different color LED lamps are mounted in a window 245 in the tower 235 (best illustrated in FIG. 3) of the base 22. The tower 235, the LED window 245 and the shroud 24 are provided with a geometry that automatically registers the three different color LED lamps with three apertures 250 (best illustrated in FIGS. 5 and 6) of the shroud 24. The output signals 223, illustrated in the schematic of the microprocessor 220 of FIG. 18, drive the audio enunciator 241 and the LED display 31 according to the logic hereinafter described in the operation of the water treatment system. It should be understood that to program the CMOS general purpose microprocessor to provide the logic outputs necessary to drive the buzzer and LED lamps as set forth hereinafter is well within the scope of knowledge of one of ordinary skill in the art.

OPERATION

The water treatment system 10 is first connected to a source of cold tap water (drinking water) with a diverter valve, such as the one illustrated at 15 in FIG. 1, or a dedicated cold water drinking tap not illustrated herein. The filter cartridge 28 of the unit is then inserted by pulling the front cover or shroud 24 forward in the direction of the arrows 39 in FIG. 5. Symbols provided on the exterior of the filter cartridge 28 are aligned with symbols provided on the base 22 of the unit and the water filter outlet 61 is plugged into the port 68 in the base 22 (best illustrated in FIG. 3). While pressing on the top of the filter cartridge 28, the user turns the cartridge clockwise until all of the radially-extending tangs 65 on the periphery of the filter cartridge 28 are fully meshed with the apertures 66 in the base 22. These steps are reversed to remove the filter cartridge.

The UV lamp 21 is installed by removing the compartment cap 251, illustrated in FIG. 3, and inserting the UV lamp assembly, including quartz tube 90 and compression nut 92, into the upwardly-facing opening 252 in neck 93 of the pressure vessel 52, which projects upwardly from the back of the tower 235 of the base 22. The UV lamp power cord and the plug 41 is then connected to the four upstanding electrical connectors 40 extending from the top of the UV lamp 21. Because the UV lamp is rotatably mounted on the compression nut 92, the nut turns freely. The user then turns the nut in a clockwise direction until it is tight to firmly attach the UV lamp 21 in the pressure vessel 52. The compartment cap 251 is then replaced and the unit is plugged into a convenient source of electrical power, such as the household electrical outlet illustrated at 18 in FIG. 1. The filter monitor circuit and UV lamp monitor circuit are then initialized by pushing buttons 242 on the top of the tower 235 of the base 22. The unit is ready for operation when the shroud 24 is pivoted forward so that all internal components are covered and the unit takes the configuration illustrated in FIGS. 1 and 5 with the shroud closed. These steps are reversed to remove the UV lamp.

The power cord for the water treatment system unit includes an appliance leakage current interrupter (ALCI) 140, which automatically detects electrical current leakage from the device. When an electrically-dangerous condition arises, the ALCI automatically shuts electrical power off to the water treatment system. The procedures for setup and re-setup of ALCI devices is well-known.

The diagnostic (filter monitor and UV lamp monitor) circuits of the water treatment system keep the user informed on a continuous basis of the water treatment system's condition. The operating conditions of the water treatment system are continuously indicated by an audio enunciator/buzzer 241 and the LED display 31 (FIG. 3). When the front shroud 24 is closed and the power is turned on, the green LED or lamp lights up, indicating that the unit is operating normally. When treated water is flowing through the water treatment system, the green lamp blinks. When maintenance of the water treatment system is necessary, the buzzer sounds and the red or orange LEDs signal the corrective action required. One sound of the buzzer indicates that maintenance will soon be required. When the filter or the UV lamp must be changed immediately, the buzzer sounds twice in rapid succession. Whenever the buzzer sounds, the user must check the blinking condition of the LED display to determine the type of maintenance necessary.

The microprocessor 220, illustrated in FIG. 18, is programmed to provide output signals 223 to the buzzer and LED drivers contained on enunciator board 240, according to the following table, to indicate the condition of the water treatment system unit and the type of maintenance required. Generally, when the green lamp is on, the user is free to use the water treatment system unit. When treated water has passed through the unit and the green lamp is blinking alternately with another lamp, maintenance is necessary but the user can still continue to use the water treatment system. When the green lamp is out, maintenance is required immediately. In this case, the user is not to use the water treatment system. If the system horn or buzzer beeps constantly, the unit should be unplugged immediately. Electrical problems may be present:

LOGIC TABLE

| | When treated water is flowing | | | | When treated water is not flowing | | | |
|---|---|---|---|---|---|---|---|---|
| | | Lamp | | | | Lamp | | |
| Buzzer | Red (ultraviolet lamp) | Orange (filter) | Green (operating) | Buzzer | Red (ultraviolet lamp) | Orange (filter) | Green (operating) | Condition |
| None | out | out | blinking | none | out | out | on | Normal operation. |
| One sound at beginning of use | out | blinking | blinking | none | out | out | on | Usable but filter needs to be changed soon. |
| One sound at beginning of use | blinking | out | blinking | none | out | out | on | Usable but ultraviolet lamp needs to be changed soon. |
| One sound at beginning of use | blinking | blinking | blinking | none | out | out | on | Usable but filter and ultraviolet lamp need to be changed soon. |
| Sounds while water is flowing | out | blinking | out | none | out | blinking | out | Unusable. Necessary to change the filter immediately.[1] |
| Sounds while water is flowing | blinking | out | out | none | blinking | out | out | Unusable. Ultraviolet lamp needs to be changed immediately.[2] |
| Sounds while water is flowing | blinking | blinking | out | none | blinking | blinking | out | Unusable. Filter and ultraviolet lamp need to be changed immediately.[1] [2] |
| Sounds continuously | blinking | out or blinking | out | sounds continuously | blinking | out or blinking | out | The ultraviolet lamp is not operating. Change it. If the same condition persists even after putting in a new lamp, do not use the unit and cut the power immediately. |

[1] After changing the filter, reset the filter monitor.
[2] After changing the ultraviolet UV lamp, reset the UV lamp monitor.

The above description should be considered exemplary and that of the preferred embodiment only. It should be understood that modifications will occur to those who make and use the invention. The true scope and spirit of the present invention should be determined with reference to the appended claims and it is desired to include within the present invention all such modifications that come within the proper scope of the claims.

We claim:

1. A point of use water treatment system for home use comprising:
   a pressed carbon block filter for removing particulates and organic contaminants from water, said filter comprising:
   (i) an activated carbon having a narrow pore size distribution with a substantial number of pores that are 10 microns in diameter and less;
   (ii) a high molecular weight low melt index polymeric binder which minimizes masking of said activated carbon; and
   (iii) a radially inward flow path extending between a radially distal filter water inlet and a centrally located filter water outlet; and
   a source of radiant ultraviolet energy for receiving water from said filter and killing microorganisms in said water, said source of radiant energy comprising:
   (i) an elongate ultraviolet discharge lamp having an elongate central axis defining an axial direction;
   (ii) means for establishing plug-like spiral flow with a substantial axial and tangential component about said elongate ultraviolet discharge lamp between a source water inlet and a source water outlet;
   means for housing said pressed carbon block filter and said energy source;
   interlock means for automatically disconnecting said energy source from a power supply when a user accesses said housing means;
   filter monitoring means for monitoring the amount of water flowing through said filter and providing an indication to a user when said filter has reached end-of-life; and means for automatically reducing power to said energy source in response to a signal from said filter monitoring means
   whereby filtration is optimized, ample water flow is provided, water quality is maximized and microbiological kill rates are enhanced.

2. A point of use water treatment system for home use as claimed in claim 1, further comprising:
   filter quick-disconnect means for allowing the user to quickly and easily change said filter in response to an indication from said filter monitoring means.

3. A point of use water treatment system for home use as claimed in claim 1, further comprising:
   radiant energy monitor means for monitoring performance of said energy source and providing an indication when said energy source has reached end-of-life.

4. A point of use water treatment system for home use as claimed in claim 3, further comprising:
   source quick-disconnect means for providing a user with the ability to change said energy source in response to an indication from said radiant energy monitor means.

5. A point of use water treatment system for home use comprising:
   a pressed carbon block filter for removing particulates and organic contaminants from water, said filter comprising:
   (i) an activated carbon having a narrow pore size distribution with a substantial number of pores that are 10 microns in diameter and less; and
   (ii) a high molecular weight low melt index polymeric binder which minimizes masking of said activated carbon; and
   (iii) a radially inward flow path extending between a radially distal filter water inlet and centrally located filter water outlet; and
   a source of radiant ultraviolet energy for receiving water from said filter and killing microorganisms in said water, said source of radiant energy comprising:
   (i) an elongate ultraviolet discharge lamp having an elongate central axis defining an axial direction; and
   (ii) means for establishing plug-like spiral flow with a substantial axial and tangential component about said elongate ultraviolet discharge lamp between a source water inlet and a source water outlet;
   flow regulator means for regulating water flow through the water treatment system under varying water source pressures;
   filter monitoring means for monitoring the amount of water flowing through said filter and providing an indication to a user when said filter has reached end-of-life; and
   means for automatically reducing power supplied to said energy source in response to a signal from said filter monitoring means; and
   filter quick-disconnect means for allowing the user to quickly and easily change said filter in response to a said indication from said filter monitoring means;
   whereby filtration is optimized, ample water flow is provided, water quality is maximized and microbiological kill rates are enhanced.

6. A point of use water treatment system for home use, comprising:
   a pressed carbon block filter for removing particulates and organic contaminants from water, said filter comprising;
   (i) an activated carbon having a narrow pore size distribution with a substantial number of pores that are 10 microns in diameter and less;
   (ii) a high molecular weight low melt index polymeric binder which minimizes masking of said activated carbon; and
   (iii) a radially inward flow path extending between a radially distal filter water inlet and centrally located filter water outlet; and
   a source of radiant ultraviolet energy for receiving water from said filter and killing microorganisms in said water, said source of radiant energy comprising:
   (i) an elongate ultraviolet discharge lamp having an elongate central axis defining an axial direction; and
   (ii) means for establishing plug-like spiral flow with a substantial axial and tangential component about said elongate ultraviolet discharge lamp between a source water inlet and a source water outlet; and
   flow regulator means for regulating the water flow through the water treatment system under varying water source pressures;
   filter monitoring means for monitoring the amount of water flowing through said filter and providing an indication to a user when said filter has reached end-of-life;
   filter quick-disconnect means for allowing the user to quickly and easily change said filter in response to an indication from said filter monitoring means;

radiant energy monitor means for monitoring performance of said energy source and providing an indication when said source has reached end-of-life;

means for automatically reducing power supplied to said energy source in response to a signal from said filter monitoring means; and source quick-disconnect means for providing a user with the ability to change said source of radiant energy in response to an indication from said radiant energy monitor means;

whereby filtration is optimized, ample water flow is provided, water quality is maximized and microbiological kill rates are enhanced.

* * * * *